April 11, 1944.  W. L. LEWIS ET AL  2,346,263
CARD PUNCHING MACHINE
Original Filed Aug. 6, 1941   6 Sheets-Sheet 1

April 11, 1944.　　W. L. LEWIS ET AL　　2,346,263
CARD PUNCHING MACHINE
Original Filed Aug. 6, 1941　　6 Sheets-Sheet 2

INVENTORS
William L. Lewis
Elliott W. Gardiner
BY
W. M. Wilson
ATTORNEY

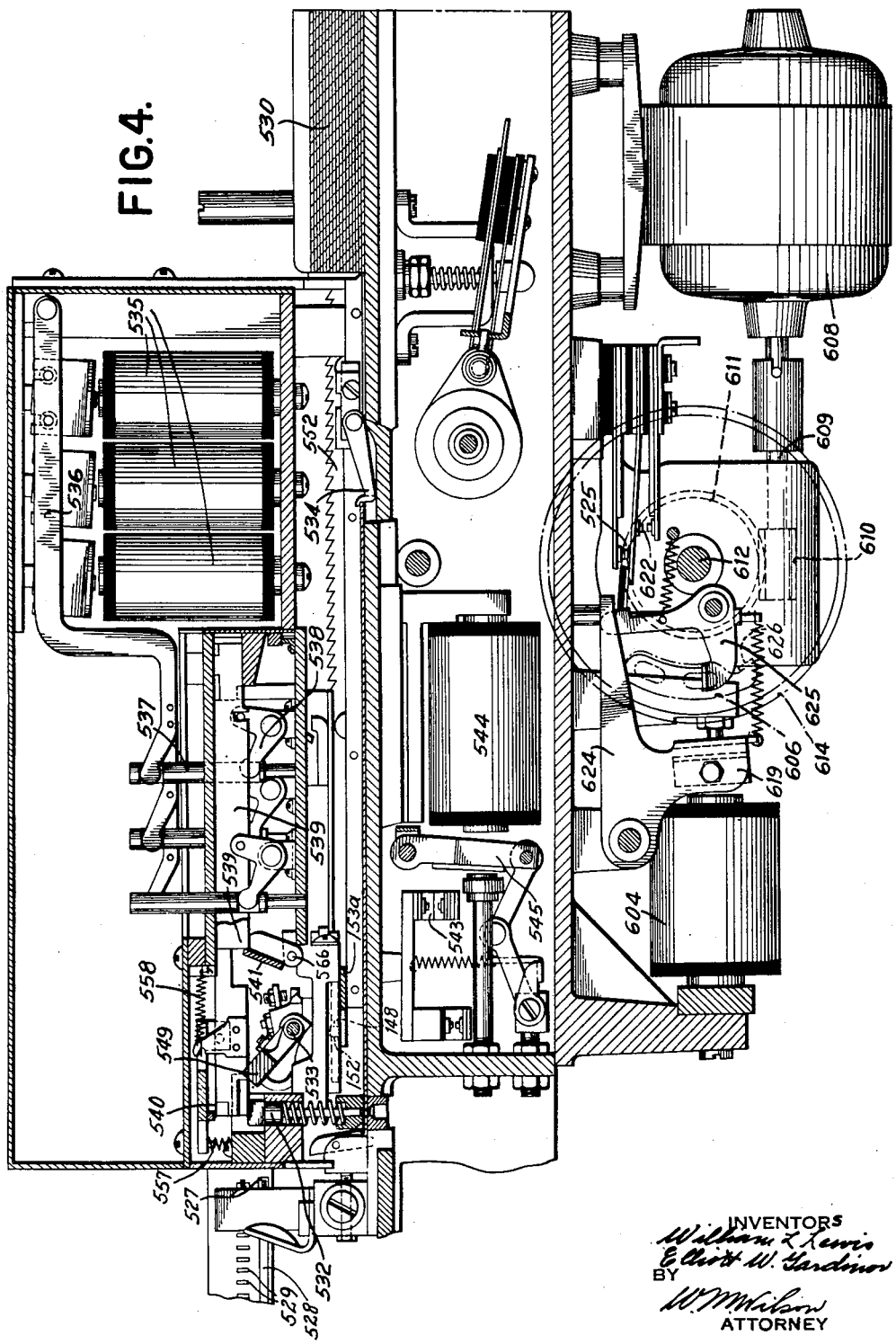

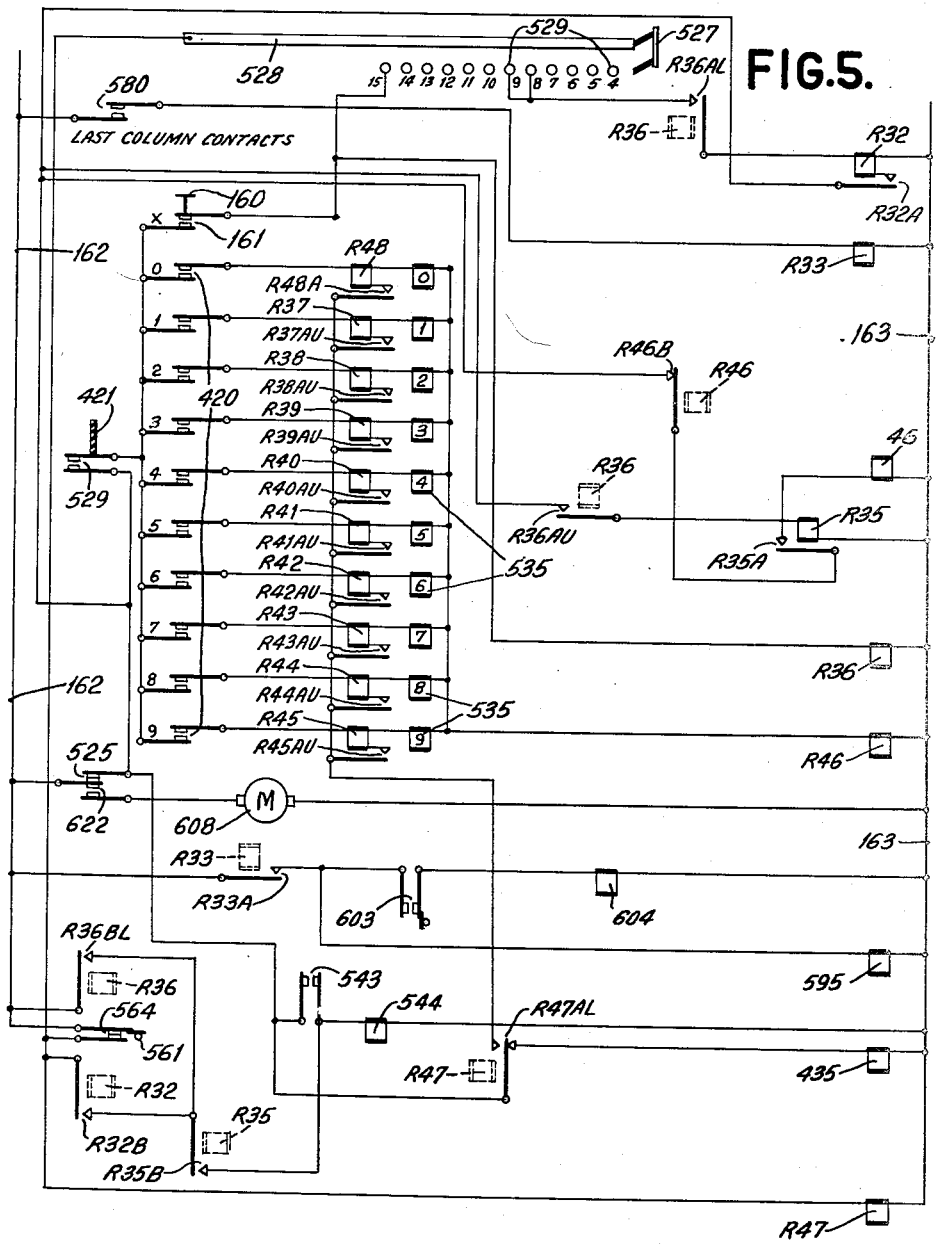
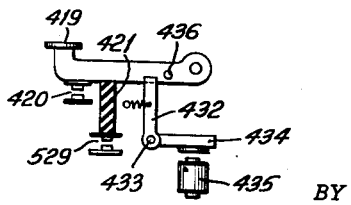

April 11, 1944.    W. L. LEWIS ET AL    2,346,263
CARD PUNCHING MACHINE
Original Filed Aug. 6, 1941    6 Sheets-Sheet 5
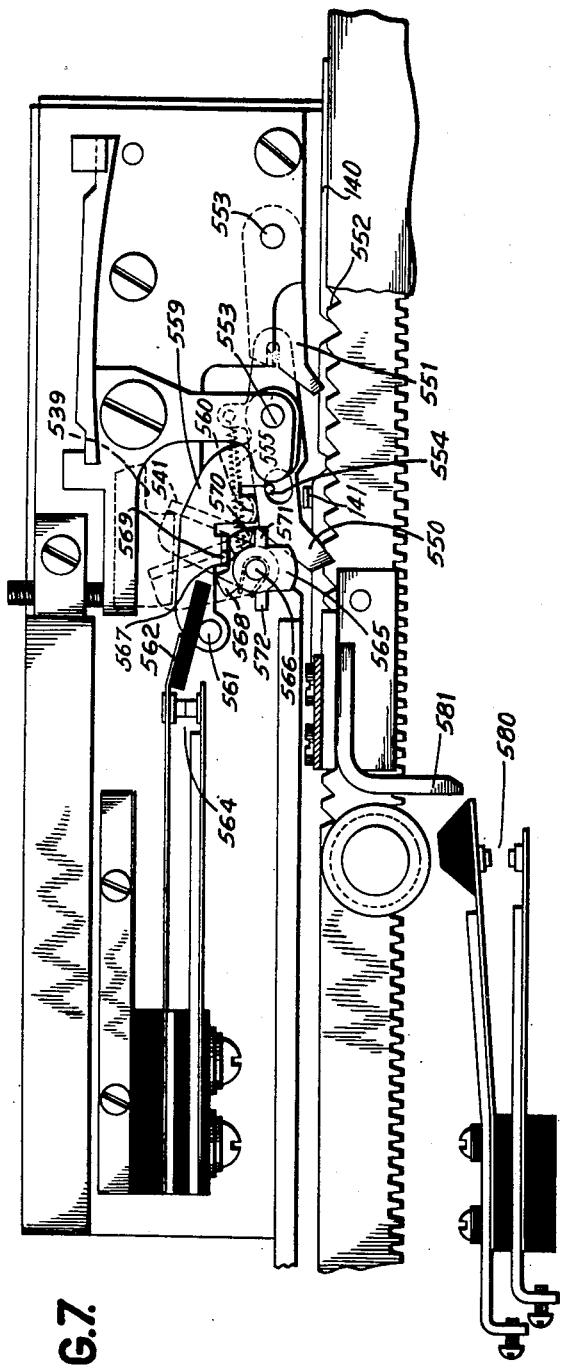
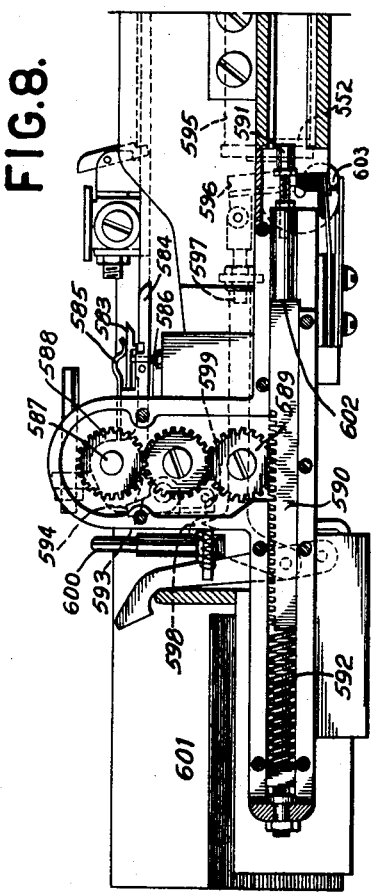
INVENTORS
William L. Lewis
Elliot W. Gardiner
BY
ATTORNEY Patented Apr. 11, 1944

2,346,263

UNITED STATES PATENT OFFICE 2,346,263

CARD PUNCHING MACHINE

William L. Lewis, Binghamton, and Elliott W. Gardinor, Conklin, N. Y., assignors to International Business Machines Corporation, New York, N. Y., a corporation of New York Original application August 6, 1941, Serial No. 405,628. Divided and this application February 19, 1943, Serial No. 476,422

7 Claims. (Cl. 164—113)

This invention relates to punching machines and more particularly to that type which is adapted to punch tabulating cards and which has included therewith a skipping mechanism which enables the omission of punching of certain card columns.

This application is a division of the parent application, Serial No. 405,628, filed August 6, 1941, and the subject matter asserted by claims herein is directed to the novel structure of the card carriage skipping mechanism.

A feature of the form of punching machine shown herein is the incorporation of a skipping mechanism which will enable the skipping of the punch carriage from the last column of one field to a predetermined or intermediate column of the next field, or column 10 herein by way of example, columns 7, 8, 9 which are skipped being those at the left of the first significant digit which would ordinarily be punched to represent zeros. This is performed by the depression of the "X" or skip key after the last column, or column 6 has been punched. By such means, and by way of example, three columns of "0" punching may be omitted in the present machine, thus saving the time of the operator by eliminating unnecessary "0" punching.

It is, nevertheless, frequently desirable that a single digit representation be punched in either of the two highest card columns of the second field, such as columns 7 and 8 herein. When punching of a digit has been effected in the last column of the first field (or column 6 herein), the carriage will be spaced in the usual way to column 7. The operator then depresses the desired digit punching key to perforate column 7. Thereafter, the "X" or skip key is depressed and by special means which is brought into operation when the card carriage is at column 8 the skipping operation is effected but instead of stopping at card column 10 the carriage will be skipped beyond this position to the last card column position of the card.

If column 8 is to receive a perforation to represent a digit the operator will, when the carriage is in column position 7, depress the usual "space key" of the punching machine so that the card carriage will be spaced in the usual way from column 7 to column 8. In this case, the depression of the digit punch key will perforate column 8. Thereafter, the operator will depress the "X" or skip key and the card carriage will be skipped beyond the tenth card column position to the last card column position.

This last named operation, that is, perforating either card column 7 or card column 8, is desirable where cards are punched to represent amounts in even tens of thousands or hundreds of thousands of dollars, such as $10,000.00 or $100,000.00, or digital multiples thereof. In such instances, it is only necessary to punch the left hand digit without the remaining zeros at the right so that after punching the single left hand digit the card carriage can, by the depression of the "X" or skip key, be skipped to the last card column position for ejection of the card in the usual manner. Obviously, by the depression of the "X" or skip key after punching this single digit in either columns 7 or 8, the punch carriage would be skipped and would normally stop at the predetermined card column position or column 10 herein. Of course, such normal operation should be prevented and a relatively important feature of the present machine is to cause the means which normally effects the stopping of the card carriage at the predetermined column 10 to be ineffective when the "X" or skip key is operated with the card carriage in either columns 8 or 9, to enable the card carriage to be skipped beyond such predetermined tenth card column position. The normal stopping of the card carriage at column 10 is prevented by special means brought into operation when the "X" or skip key is operated with the card carriage in either card column positions 8 or 9.

An object of the invention is, therefore, to provide broadly means under control of the punch carriage to determine whether the carriage is to be skipped to the predetermined column position or automatically beyond such column position.

A still further object of the invention is to improve the skipping mechanism by causing an electromagnetic means to elevate the locking dog of the carriage escapement mechanism, and to provide an electromagnetic means to shift the skip lifter. The first preferably consists of the usual punch operating magnet which has considerable power, thus enabling the other electromagnet to be smaller since its only function is to shift the skip lifter arm which, in cooperation with the skip bar, keeps the dog elevated after it has been raised by the punch magnet.

Other objects of the invention will be pointed out in the following description and claims and illustrated in the accompanying drawings, which disclose, by way of example, the principle of the invention and the best mode, which has been contemplated, of applying that principle.

In the drawings:

Fig. 4 is a longitudinal sectional view of the punching machine on a larger scale.

Fig. 5 is a wiring diagram.

Fig. 6 is a representation of the operating parts of the keyboard and associated electromagnetic key locking device.

Fig. 7 is a detail view illustrating certain contact making mechanism of the punching machine controlled by the escapement mechanism and also by the card carriage.

Fig. 8 is a view in side elevation of the left end of the punching machine, showing the card ejecting mechanism therefor.

PURPOSE OF ARRANGEMENT

Figure 1:
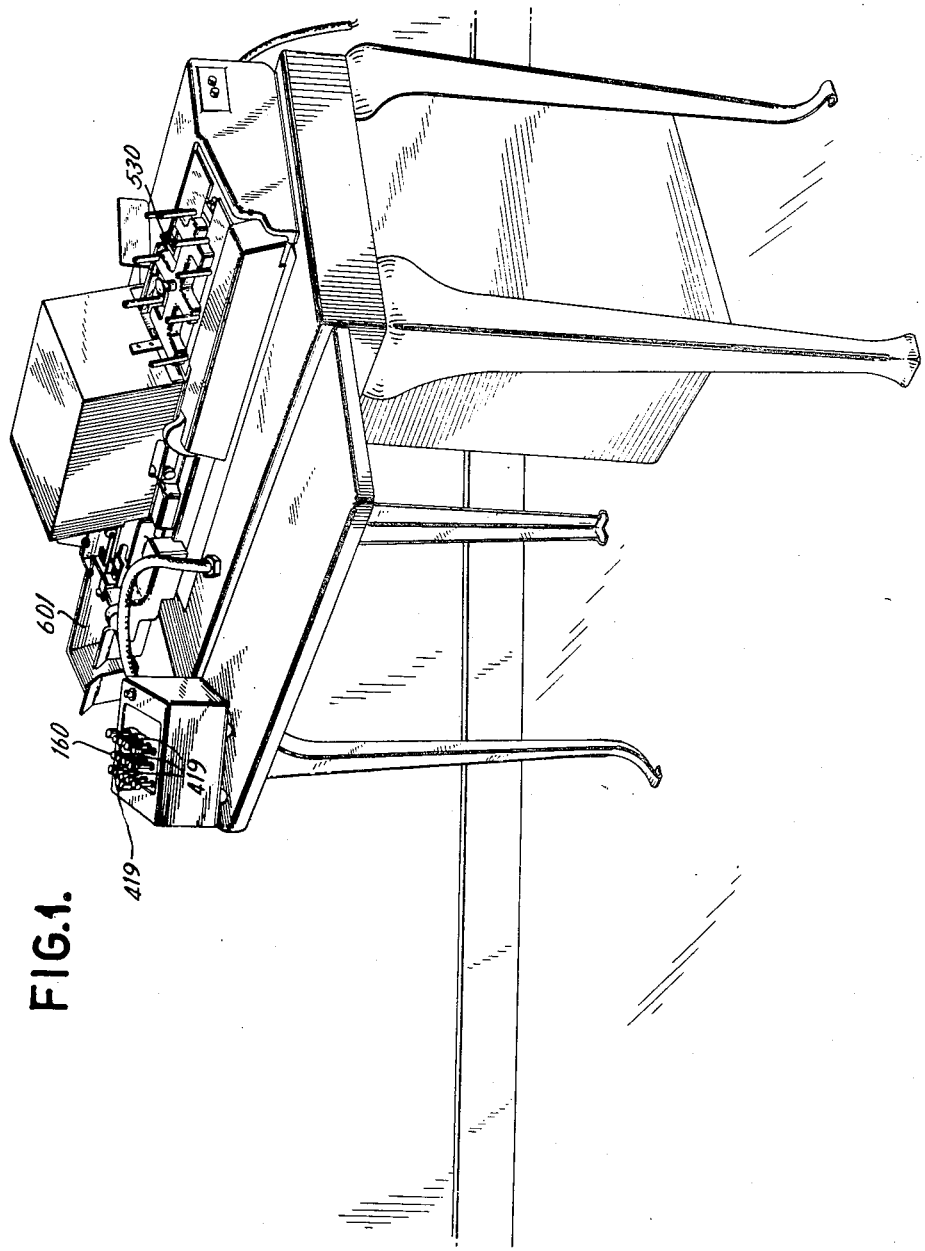
Fig. 1 is a perspective view of the card punching machine and the keyboard which are connected together for inter-related operations by an electrical cable. It should be noted that both the punching machine and associated keyboard are mounted on a table for convenient access by the operator.

The present punching machine as fully shown in the parent application is combined with a printing machine to aid in the discovery of errors which would be likely to be made in accounting operations which involve the hand sorting of bank checks. The punching machine is adapted by the depression of the keys of a keyboard to punch the amounts of the checks and the classification numbers of the checks. The classification numbers perforated upon the cards are also printed on the back of the checks by the printing machine shown in the parent application. For each group of numbered checks there is a group of punched cards correspondingly sorted. By sorting machines of a well known type the punch cards are sorted according to their classification numbers and, if so desired, a sorting machine provided with a counting attachment may be utilized to count the number of cards sorted in each group.

The invention asserted herein is directed to the provision of a skipping mechanism which avoids the necessity of punching certain columns when such columns are not required to be punched, due to the small amount of the check and to eliminate punching of zeros to the right under certain other circumstances.

The present invention is not restricted in its utility and may find wide applications in other forms of record making machines, particularly of the type which provide for skipping mechanism to eliminate the necessity of printing, punching or recording data on record material.

CARD PUNCHING MACHINE

The card punching machine herein illustrated is of the type shown in the patent to Fred Lee and George Daly, No. 1,976,618, dated October 9, 1934, and only so much of the operation thereof will be explained as is necessary for an understanding of its operation in connection with the present invention.

In general, the punching machine contains a feed magazine 530 (Figs. 2, 3, and 4) from which the cards are fed singly from the bottom of the magazine by a picker 531 (Fig. 2) which feeds the cards to a position under the punches 532 (Fig. 4) and in the present machine, the carriage escapes to present the fourth column of the card to the punches preparatory to receiving the perforations effected by the first manual punching operation. From this position, the card is engaged at its rear edge by a pusher 534 mounted upon an escapement rack 552 (Fig. 4), which, for each operation of the punches, permits the advance of the card step by step. A series of magnets 535 is adapted to select the punches 532 for actuation in the following manner: Associated with each magnet 535 is a pivoted armature 536 whose free end is connected to a rod 537 which, through a bell crank 538, moves an interposer bar 539 to the left in Fig. 4 where it cooperates with a punch bar or plate 540. The forward movement of the interposer bar 539 is adapted to rock a bail 541 pivoted on a rod 566 and which in Fig. 3 is shown as connected to a spring pressed depending link 542 whose lower free end is adapted to engage and close contacts 543. This, as shown in Fig. 5, closes a circuit from the line 162 through contacts 525 now closed, through contacts 543, through the magnet 544 to the line 163. The energization of the magnet 544 will then attract its armature 545 and through a link and bell crank connection 546 (Fig. 3) will draw downwardly on the pivoted punch bar or plate 540 to force the selected interposer against the associated punch, thus perforating the card.

The selection of the magnets 535 for effecting the punching operations is under control of a series of keys 419 which close contacts 420 (Figs. 5 and 6) and preferably such keys are mounted in a keyboard separate from the usual keys (see Fig. 1) of the punching machine so that punching operations may be controlled at a location away from the punching machine. The keys are shown diagrammatically in Fig. 6 and consist of pivoted members which are rocked upon the depression of the key cap so as to close the related key contacts 420. Underlying each of the keys and operated thereby is a bail 421 which, upon a key depression, is adapted to close contacts 529. Upon a depression of any key, the bail contacts 529 are closed and then the contacts 420 are closed by the depression of a key to thereby extend a circuit from the line 162 through contacts 525, thence through contacts 529, and through the related key operated contacts 420 to one of a series of relays R37 to R45 and R48, inclusive and thence to a related punch selecting magnet 535, then through a relay magnet R46 to the line side 163. For example, the punch magnet 535 for punching the digit zero is energized as well as its related relay R48 when the zero key 419 is operated to close its contacts 420.

Under control of the keys 419, the aforesaid relays will be selectively energized and each will close its related stick contact AU or A and the stick circuit will thereupon be extended from the line 163 through the relay magnet R46, the selected relay R37 to R45 and R48, its associated stick contact and then via a line to relay contacts 47AL now shifted and then through the contacts 525 back to the line 162. Referring to Fig. 5, numeral 564 designates contacts which are in the punching machine as shown in Fig. 7, and it will be observed are normally closed. The normal closure of the contacts 564 closes a circuit from the line 162 through the contacts 564 and then through a relay magnet R47 to the line 163. Since contacts 564 are normally closed, the contacts R47AL will normally be shifted to extend the stick circuit just described to the line 162. As will subsequently be described, the contacts 564 are then opened and remain open until the punch carriage moves to the next column position and the opening of contacts 564 will thereupon break the stick circuit to the selected relay and the associated punch magnet 535. This will enable the punch operating parts of the punching machine to be returned to normal position independently of the control of their operation by keys 420.

It is, of course, desirable that a subsequent key operation be prevented until the punch has completed its punching operation for a column and then skipped to the next column position. Referring to Fig. 6, a locking mechanism for the keys is diagrammatically shown and consists of a plurality of fingers 432 which are secured to a rock shaft 433 and to said rock shaft 433 there is connected an armature 434 of a key lock magnet 435. In the normal position of the fingers 432 they are out of locking operation with studs 436 carried by the key levers 420. From Fig. 5 it will be noted that a circuit is extended from the line 162 through contacts 525, thence through contacts R47AL to the magnet 435 to the line side 163. It will be recalled that the opening of contacts 564 will deenergize the relay magnet R47 to allow its contacts R47AL to come to a normal position, thereby causing the energization of the key lock magnet 435 to lock the keys and such locking will be effected until contacts 564 again close when the punch carriage has been spaced to the next card column position. This will prevent successive operation of the keys 420 to prevent misoperations of the punching machine. When the card carriage has skipped to the next column, contacts 564 then close to cause the energization of the relay magnet R47 and by the shifting of its contacts R47AL effect the deenergization of the key lock magnet 435. The keys are now free for a subsequent operation.

ESCAPEMENT MECHANISM

When the bar 540 is depressed in the foregoing fashion, the left end of the selected interposer will, of course, be depressed thereby rocking a bail 549 pivoted on a shaft 553 in a counterclockwise direction (Fig. 4) to raise an escape dog 550 (Fig. 7) and depress a locking dog 551 into engagement with the escapement rack 552, the relation of the dogs being such that the locking dog 551 engages a tooth in the escapement rack 552 before the dog 550 becomes fully disengaged from said rack. The dog 550 is pivotally mounted upon an extension of a shaft 553 and has a slot, the left end of which abuts said shaft. Said dog also has an enlarged hole cooperating with a pin 554 fixed to a short arm carried by the shaft 553 and is normally spring urged toward the left by a spring 555 interposed between a fixed part of the frame and a tail formed in the dog.

When the shaft 553 is rocked by the bail 549, the arm fixed on said shaft carrying the pin 554 will be rocked clockwise (Fig. 7) to raise the dog 550 and disengage the nose of said dog from the rack, prior to which, however, the locking dog 551 will engage a tooth of the rack. As soon as the nose of dog 550 clears the tooth of rack 552 which the dog engages, the spring 555 will draw the dog 550 to the left so that the nose of said dog will overlie the space between the next adjacent tooth to the left of the one in which the nose of said dog formerly engaged.

When the magnet 544 is energized, a projection 556 (Fig. 3) extending upwardly from and carried by the link 546 urges the lower end of the link 542 to the right so that about the time the armature 545 reaches the limit of its movement to the right, the link 542 will become disengaged from one of the spring contact members carrying the contacts 543 so as to permit said contacts to open immediately, thereby deenergizing the magnet 544 which will then release its armature, allowing a spring 557 (Fig. 4) to rock the plate 540 upwardly and permit the selected interposer 539 to rise and thereafter be restored to normal position by means of a spring 558.

As a consequence of the deenergization of the magnet 544, the bail 549 will rock clockwise to its normal position shown in Fig. 4 and the dog 551 (Fig. 7) will be raised to release the rack 552 which will then move one column space to the left by the usual spring barrel. Since the dog 550 overlies the interdental space between the next two adjacent teeth to the left, said dog will ride into said space and prevent the rack 552 from escaping more than one tooth space which corresponds to the distance between columns of the record card.

It will thus be seen that each time one of the punch selecting keys is depressed, one of the magnets 535 will be energized, and will select a punch 532 for operation, the punch selected corresponding, of course, to the particular key depressed.

As previously stated, it is desirable that the stick circuits through the relay R46 (Fig. 5), the magnets 535 and through the selected relay R37—R45 and R46 be broken after the magnet 544 has been energized to operate a selected punch and that said stick circuits remain open until the carriage has completely escaped one column space so that premature energization of another magnet 535 may be prevented. For this purpose, there is provided mechanism illustrated in Fig. 7 and which is fully shown and described in the patent to W. F. Gutgesell, No. 1,939,049.

Pivotally mounted on the rod 553 adjacent the dog 550 is a member 559 having a lug 560 overlying the upper edge of the dog 550 so that when said dog is raised by the pin 554 as described, the member 559 will be rocked clockwise. The member 559 has a pin 561 underlying a block of insulating material 562 carried by a spring contact member of contacts 564 which are mounted upon and insulated from a fixed part of the frame. The contacts are so disposed that when in the position shown in Fig. 7, they will be closed by engaging each other. When the dog 550 is raised by the pin 554 by consequence of the rocking of the bail 549 counterclockwise (Fig. 3), the member 559 will be rocked clockwise (Fig. 7), thereby raising the pin 561 and opening the contacts 564 to break the circuits closed therethrough.

In order to hold the contacts 564 in contact with each other until the carriage has fully escaped, there is provided mechanism controlled by the rockable bail 541 which holds the pin 561 in elevated position until the dog 550 has been rocked back into engagement with the next adjacent tooth in rack 552. This mechanism comprises a T-shaped member 565 fixed upon the shaft 566 upon which is fixedly mounted the bail 541.

Pivotally mounted on the shaft 566 is a spring operated member 567 having a lug 568 which normally engages the left side (Fig. 7) of a transverse lug 569 formed in the member 559. The member 567 is normally in the position shown in Fig. 7 with its coiled operating spring holding a bent-over lug 570 in said member in engagement with a lug 571 formed in the T-shaped member 565, the coil spring operating the member 567 being interposed between a lug 572 in the member 565 and the left edge of lug 568 in member 567.

When the bail 541 is rocked counterclockwise, due to the leftward movement of one of the punch interposers 539 (Fig. 4), the T-shaped member 565 will be rocked clockwise as in Fig. 7 but the lug 568 will be held by the lug 569 and prevented from movement as a consequence of which the coil spring interposed between the lugs 572 and 568 will be tensioned. After the bail 541 has rocked far enough to close the contacts 543 the magnet 544 will be energized, thereby rocking the bail 549 and shaft 553 in a clockwise direction as shown in Fig. 7 to raise the dog 550 and rock the member 559 clockwise.

As a consequence of this movement the lug 569 will be carried upwardly and will clear the lug 568 which, it will be remembered, is held stationary by the lug 569 during the rocking of the bail 541, as described, so that the coil spring between lugs 572, 568 will cause the lug 568 to snap under the lug 569 and prevent the member 559 from being restored when the dog 550 rides down into the next tooth space to the left (Fig. 7) and will be held in this position until the bail 541 is restored to normal position (Fig. 4).

As a consequence of the deenergization of the punch magnet 544, the bail 549 will rock clockwise (Fig. 4) and the selected interposer 539 will be restored by its spring 558, thereby permitting the bail 541 to rock back to its normal position as shown in Fig. 4.

The lug 568 is so proportioned that it will not clear the lug 569 in member 559 until the bail 541 has reached its home position. Consequently, the contacts 564 cannot reclose until bail 541 has been permitted to return to its normal position, which, of course, will not happen until the selected interposer has likewise returned to its normal position. The contacts 564 are connected in the circuit to the relay R47 (Fig. 5) so that it will be clear that the relay R47 shifts its contacts R47AL to energize the key lock magnet 435 to lock the keys during the period in which the contacts 564 are open.

COLUMN SELECTOR

The column selector for punching comprises the movable contact brush 527 (Fig. 4) carried by the card carriage and engageable with a reading strip comprising a common contact strip 528 and contact points 529 (see also Fig. 5) certain of which are connected to cause certain functions to be performed when the carriage is at certain column positions in a manner to be subsequently explained.

For further details of the construction of this column selector, reference may be had to the patent to G. F. Daly et al. No. 2,016,706, dated October 8, 1935.

CARRIAGE SKIPPING MECHANISM

The particular operation of the skipping mechanism as it is utilized in connection with the present invention will be subsequently described in detail. At the present time it should be noted that, upon the completion of punching of the amount on a card, there is an automatic skipping of the card carriage to the last column position. At this last column position of the punch carriage, contacts 580 (Fig. 7) will be closed by means of a projection 581. As long as the punch carriage is in its last column position, contacts 580 are closed. Referring to Fig. 5, the closure of the contacts 580 will connect relay R33 across the lines 162 and 163 and the energization of relay R33 will close its contacts R33A, thereby extending the circuit from line 162 through relay contacts R33A, thence through the card ejecting control magnet 595 to the line 163.

The present machine is also provided with a card ejecting mechanism and a power driven card feeding mechanism so that a new card is fed to the carriage after the punched card has been ejected. These mechanisms are also well known in the art and are shown in the patents to Lee and Daly, No. 1,976,618; F. M. Carroll, No. 1,976,600; and H. L. Read, No. 1,962,750, and for this reason are only generally explained herein. The card ejecting mechanism is shown in Fig. 8 and is set into operation by the energization of the card ejecting control magnet 595 by the circuits just outlined in detail.

The operation of the card ejecting mechanism is described as follows:

CARD EJECTING AND CARRIAGE RETURN MECHANISM

Stated generally, the gripper comprises a pair of jaws 583 and 584 (Fig. 8) urged together by a flat spring 585 but the abutment of a pin 586 with the upper jaw 583 separates the jaws in order that the punched card may be received by the slit-like separation. The card occupies a position between the jaws at the termination of the skipping of the carriage to the last column position.

The gripper is pivotally mounted on a shaft 587 to which is secured a gear 588 adapted to be driven by a gear 589 through an idler gear. Meshing with gear 589 is a slidably mounted rack 590, the extremity of which terminates in an adjustable cylindrical plunger 591. During the previous restoration of the card carriage, the end of rack 552 engages plunger 591 to shift rack 590 to the left against the tension of a spring 592. This caused a clockwise movement of shaft 587 through the train of gears 588—589 to bring the gripper unit to the position shown in Fig. 8, whereupon a latch lever 593 engaged a shoulder 594 of the lower jaw 584. Incidentally, a certain amount of compression was stored up in spring 592. Shifting of latch 593 is effected by energization of the magnet 595 which attracts its armature 596 when the magnet is energized. This causes a shifting movement of a link 597 to the right and by means of a cam shoulder 598 an arm 599 secured to the pivot shaft of latch 593 will rock the latter.

This will result in the release of spring 592 to cause the counterclockwise rotation of the gripper unit. As the jaw 593 leaves pin 586 spring 585 will act to close the jaw 583 upon the lower jaw 584 thus securely gripping the card and flipping the same in reversed position. A stationary pin 600 may suitably coact with one of the jaws to separate them, permitting the released card to fall into a receptacle 601. As the card is ejected, shifting of rack 590 by spring 592 will cause a square shoulder 602 to engage and close contacts 603. Since contacts 603 are now closed as well as relay contacts R33A, it will be seen from Fig. 5 that a circuit will be completed to a clutch control magnet 604 to energize the latter.

It will now be made clear that after the card has been ejected, the motor restoring mechanism will be set into operation to automatically restore the card carriage without attention of the operator.

Figure 2:
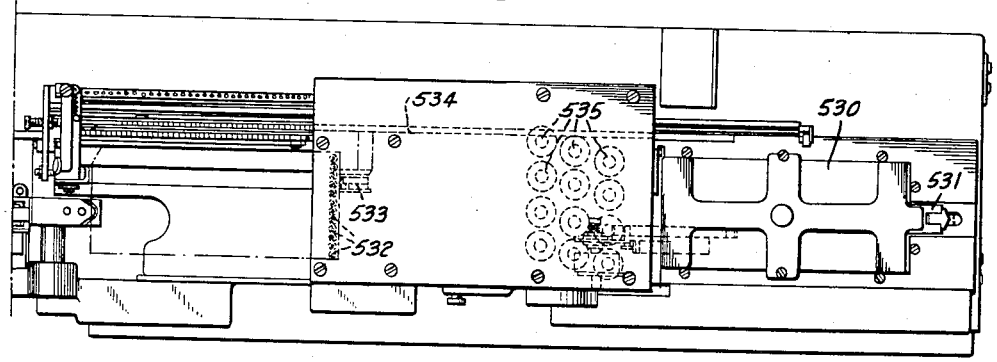
Fig. 2 is a plan view of the preferred form of punching machine.
Figure 3:
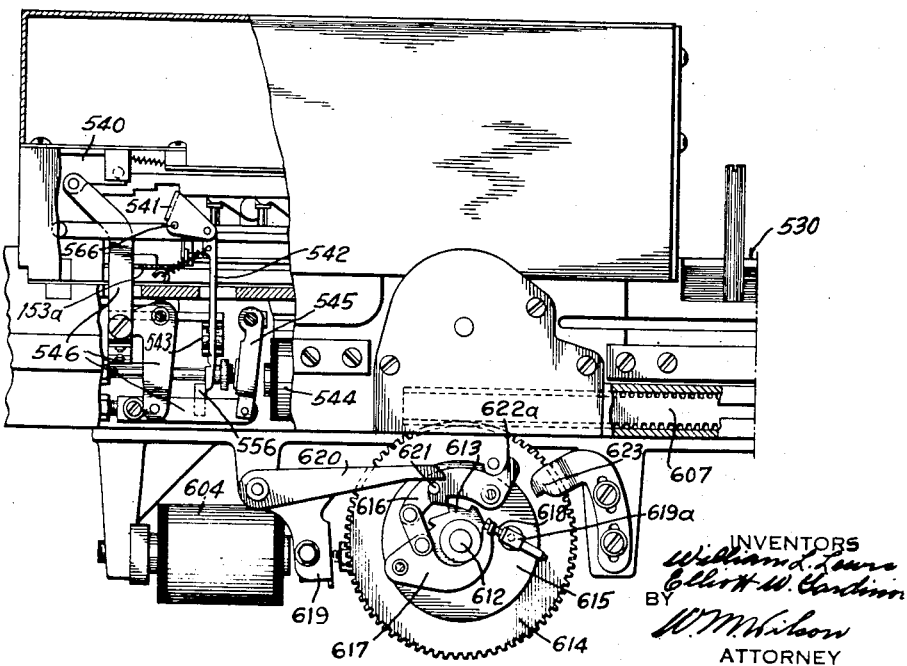
Fig. 3 is a front view of the punching machine broken away to show certain interior parts.

In Fig. 2 the picker 531 is connected to a rack 607 (Fig. 3) which is actuated to the left to introduce a new card from the magazine 530 to punching position. Secured to the underside of the base of the machine is a motor 608 (see Fig. 4) having a coupling connection to a stud shaft 609 to which is secured a worm 610 meshing with a worm wheel 611 secured to a shaft 612 one end of which has secured thereto a ratchet-shaped clutch element 613 (Fig. 3). Loosely mounted on shaft 612 is a gear 614 meshing with teeth on the underside of rack 607 and to which gear is secured a disk 615. Pivoted upon the disk 615 is an arm 616 having a single clutch tooth. The free end of arm 616 is connected by a link to a toggle plate 617, the end of the toggle plate distant from its pivot being articulated to a rod 618, slidably mounted in a member 619a pivoted upon the disk 615. The parts are spring held in the position of Fig. 3 which they occupy normally. By virtue of this construction, rod 618 and plate 617 act as a toggle, the spring acting to impositively hold the tooth of arm 616 in or out of engagement with the clutch teeth of ratchet wheel 613.

For the purpose of effecting the clutching action, the magnet 604 is provided and when energized attracts an armature 619 so that an arm 620 (Fig. 3) engaging the pin 621 of arm 616 will rock the tooth thereon into engagement with ratchet wheel 613. Through the connecting link the toggle connection will be moved centrifugally to its other position wherein the spring on rod 618 will act to hold the clutch tooth in engagement with the ratchet teeth. Gear 614 will thereupon be driven in a counterclockwise direction substantially a single revolution, shifting rack 607 to the left to feed a new card to the card carriage. This will similarly result in moving the card pushers and fingers to control the positioning of the cards.

At the termination of the counterclockwise movement of gear 604, a tail 622a (Fig. 3) will strike a projection 623 of a fixed plate to effect the disengagement of the arm 616 and ratchet wheel 613 by a reverse action.

Also secured to the pivot of armature 619 is an arm 624 (Fig. 4), the free end of which is adapted to bear upon an insulating block to open contacts 525 when magnet 604 is energized. Contacts 525 are retained open by a latching bell crank 625 which is adapted to be struck by bent-up plate 626 secured to gear 614 at the termination of the driving movement of the latter. Below contacts 525 are motor-control contacts 622 which are latched closed upon energization of magnet 604 to complete the motor circuit to motor 608 (see Fig. 5) and are unlatched to stop the motor at the termination of the driving operation in the manner just described.

SKIPPING MECHANISM

*Skipping to initial card column position*

The present punching machine is provided with a skipping mechanism of the type shown in the patent to Schaaf, No. 1,426,223, dated August 15, 1922, with modifications thereof to adapt the machine for specific skipping operations. The skipping mechanism includes a skip bar 140 (Figs. 7, 9 and 10) removably mounted upon the escapement rack and provided with suitable notches and cam surfaces which cooperate with the usual skip lifter arm 141 which has a beveled edge 142 (Fig. 10). By suitable means to be subsequently explained, the skip lifter arm 141 is moved rearwardly as viewed in Fig. 10 so that the beveled end 142 thereof will cooperate with the upper edge of the skip bar 140 to raise the end of the lifter.

The end of the skip lifter lies underneath the stepping dog 550 (Fig. 7) and upon being cammed upwardly elevates the dog 550 so as to be disengaged from the teeth of the escapement rack 552. This will release the carriage so that by the well known carriage moving means, the latter will move until the skip lifter arm 141 drops into a notch 140b or 140c of the skip bar 140 and the dog 550 will now drop into engagement with one of the teeth of the escapement rack 552 and interrupt further movement of the card carriage beyond the column position delimited by the notch 140b, or 140c in the skip bar. The function of the skip bar is to skip over the columns or fields which are not to be punched and the spacing of the cam portions and notches and the length of each portion is dependent upon the particular requirements of the punching job. Fig. 10 outlines the correlation between the card to be punched by the present machine and the skip bar 140 and shows in detail the necessary formation to permit skipping for the problem assumed.

It was previously indicated that upon the automatic return of the punch carriage, the latter automatically moves to the fourth column position so that the initial punching operations commence with this particular column. In the card utilized, the first two columns represent data which is common to a series of cards and each card is therefore prepunched to represent the required information. The third column represents the thousands denominational order of the bank number and since three digits are only concerned herein, it is unnecessary to manually punch the third column. Therefore, the machine is conditioned to enable the card carriage to skip to the fourth card column and to this end the skip bar 140 is provided with a high portion 140a (Fig. 10) which cooperates with the beveled end 142 of the skip lifter arm 141 so that the high cam portion will enable the elevation of the skip lifter arm 141 to elevate the stepping dog to permit the carriage to be automatically moved to the fourth column position. At this time, the skip lifter arm will drop into the first notch 140b and the card carriage will remain at this column position. Thereafter, successive manually controlled punching operations ensue to punch the card in the fourth, fifth and sixth column positions, the escapement mechanism previously described causing the step-by-step movement of the punch carriage. Whether or not the operator will continue with a successive punching operation or cause the skipping of the carriage will depend upon the denominational magnitude of the amount on the check and the skipping mechanism herein disclosed is modified so as to eliminate unnecessary punching of zeros which are not at all required when such zeros are to the left or right of the first significant digit of the amount on the check. This will speed up the operation of the machine by reduction of unnecessary punching operations.

Skipping From Column 7 to Column 10 When Amounts Are Under $1,000

The machine includes a special skip circuit by means of which the card carriage may be skipped from column 7 directly to column 10 in which latter column the first digit would be punched if the amounts of the checks are up to $999.99. This will eliminate punching of zeros in columns 7, 8 and 9 in order that the card carriage may be spaced to the tenth column to notch 140c.

Figure 9:
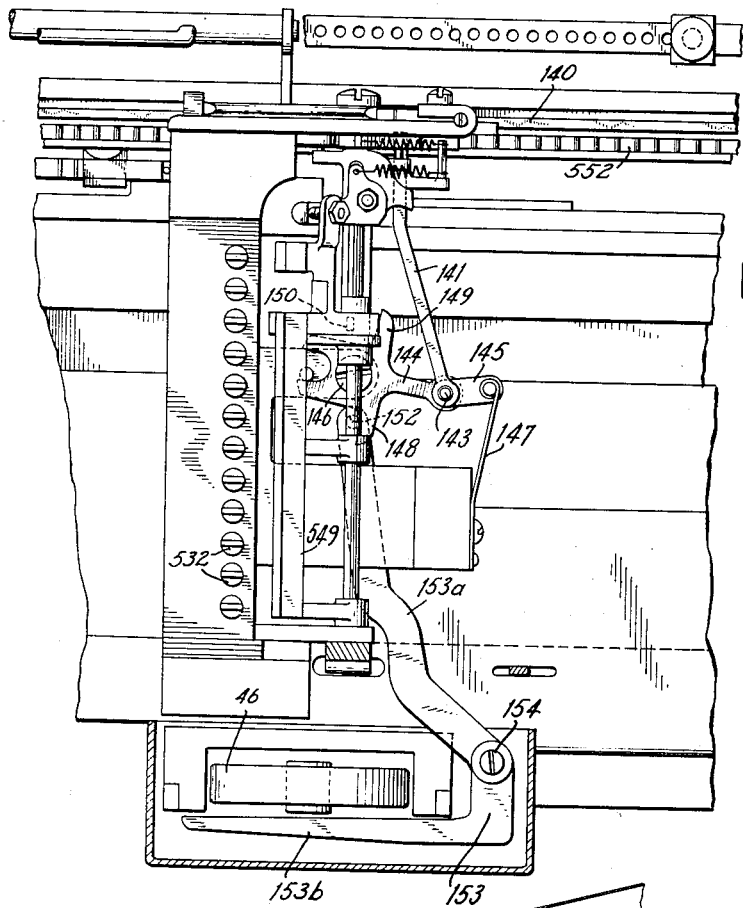
Fig. 9 is a plan view showing the electromagnetically controlled skipping mechanism.
Figure 10:
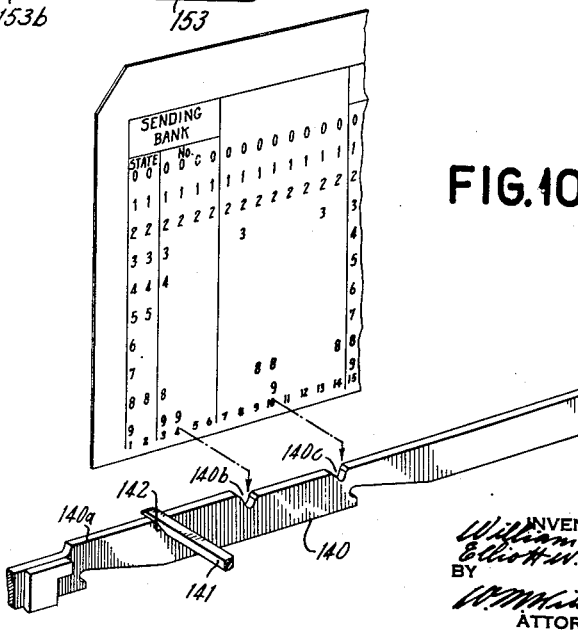
Fig. 10 is a diagrammatic view showing the interrelation of the tabulating card and the skipping bar of the skipping mechanism, clearly illustrating the formation of the skip bar for the form of card selected.

Referring to Fig. 9, the skip lifter 141 is mounted at its rear end on a pin 143 which also provides a pivotal connection between a pair of toggle elements 144 and 145. Element 144 is pivoted to the frame on a stud 146 and element 145 is connected to a leaf spring 147. These two elements constitute a toggle held to either side of dead center or neutral position by the spring 147. Pivoted element 144 is formed with oppositely and laterally extending ears 148 and 149. Ear 149 is in front of and normally at a distance from a vertical, depending projection 150 of the bail 549.

Thus far, the old parts of the present skip mechanism have been described and correspond to the skip mechanism structure shown in the patent to Schaaf, 1,426,223, hereinbefore referred to. In the punching machine shown in this patent, the operation of the key causes the shifting of the skip lifter 141 and the skipping of the carriage. In the present machine, the X key 160 (Fig. 1) is located in the separable keyboard located at a distance from the punching machine and it is therefore more convenient to utilize the X key in this keyboard to operate the skipping mechanism. In the present machine, this is performed by an electromagnet 46 (Fig. 9) and the mechanism preferably utilized is that shown in the patent to C. O. Wellman, 2,063,475, dated December 8, 1936.

Engaged with the front ear 148 of element 144 is a pin 152 extending upwardly from the forward end of arm 153a of a bell crank lever 153 journalled on the lower end of a vertically extending fixed pivot 154. The other arm 153b of bell crank 153 extends in front of the skip magnet 46. The arm 153b constitutes the armature of the skip magnet 46.

Magnet 46, when energized, attracts armature 153b to rock bell crank lever 153a, 153b clockwise and as the latter rocks clockwise its pin 152 presses against ear 148 of element 144 to rock the latter counterclockwise. This movement of element 144 actuates skip lifter 141 and the skip lifter is thereafter held in this position, due to the shifting of the toggle comprising elements 144 and 145 to the opposite side of neutral from that shown in Fig. 9.

When the operator has punched column 6 and has observed that the first digit of the amount of the check should be punched in column 10, the skip key or X key 160 (Figs. 1 and 5) is depressed which thereupon closes the bail contacts 529 and its key contacts 161 to extend the circuit from the line 162 through contacts 525, 529, the key contacts 161, to a relay R36, to the line 163. Relay magnet R36 closes its contacts R36AU, extending a circuit from line 162 through contacts 525, through relay contacts R36AU, thence through a relay magnet R35 to the line 163, and also through the skip magnet 46, to the line 163, thereby energizing the skip magnet 46 and the relay magnet R35, which relay magnet, upon its energization, closes its stick contacts R35A, thereby extending the stick circuit through relay contacts R46B and via a line back to the line 162 through the contacts 525. Closure of relay contacts R36BL and R35B resulting from the energization of the R36 and R35 relays respectively closes a circuit from line 162, through R36BL, R35B, punch magnet 544, to line 163. It is known from the structure shown in patent to Gutgesell, No. 1,939,049, dated December 12, 1933, that the energization of the punch magnet 544 alone will rock punch bar 540, an interposer 539, to cause the frame 549 to be rocked in the manner previously described and will elevate the stepping dog 550 to disengage the latter from the teeth of the escapement rack 552. This is performed in advance of the shifting of the skip lifter arm 141 so that the energization of the skip magnet 46 directly after the energization of the punch magnet 544 will cause the skip lifter arm 141 to be shifted, retaining the escapement dog 550 in its elevated position free of the escapement rack until the skip lifter arm 141 engages a notch 1430C in the skip bar 140 and which is located at column 10 of the card. The card carriage is now in a column 10 position for enabling the punching in this card column. Upon the depression of the next digit key to punch in this column, the relay magnet R46 will be energized by circuits previously described which will open the stick contacts R46B, (Fig. 5) thereby deenergizing the skip control magnet 46, enabling the skip lifter arm 141 to be returned to normal by a suitable spring (not shown). Since the skip lifter arm 141 is now in its normal position, the punch carriage may be spaced step-by-step in the usual manner as the punch selecting keys are operated. The return of the toggle element 144 (Fig. 9) is also assisted by the engagement of the depending finger 150 of the frame 549 with the toggle element 144 and as the bail is rocked, the toggle will be positively returned to its initial position as shown in Fig. 9. This results in the positive retraction of the skip lifter. Thus, the first numerical punching following the carriage skip completes restoration of the skipping mechanism.

Skipping to the Last Column Position Upon Digit Punching in Either Column 7 or 8

When the operator has punched the units digit of the bank number in column 6, there is a spacing of the card carriage to the next card column or column 7 and this column is the beginning of the card field in which the digits of the amount of the check are perforated and in this field appears columns 7 to 14 inclusive. Sometimes checks are received which represent amounts in even tens of thousands or thousands of dollars, such as $10,000.00 or $100,000.00 or multiples thereof. In such instances, it is only necessary to punch the left hand digit and not the remaining zeros. The present machine is preferably provided with an automatic skipping mechanism which is effective to skip the carriage to the last column position upon punching of this single digit in either column 7 or 8. If column 7 is punched, there will be an automatic space to column 8 and if the carriage is spaced to omit punching in column 7 to next in column 8, there will be a spacing to column 9. When the machine spaces to either column 8 or column 9 and the X key is then operated, the automatic skipping operation now to be described in detail will be effected.

Assuming that the card carriage has stepped to either the eighth or ninth column subsequent to the punching of the single digit in the selected column, it will be noted with particular reference to Fig. 5 that the column selector brush 527 will be in contact with the contact point 529 at either the eighth or ninth column position, thereby extending the circuit from the line 162 through contacts 564, thence through the brush 527, the aforementioned contact points 529, thence to the relay contacts R36AL which are now in open position, thence through the relay R32 to the line 163. When the card carriage is either at the eighth or ninth column position and the amount to be punched consists of zeros at the right thereof, the operator then depresses the X key which, by circuits previously traced, causes the energization of the relay magnet R36 and the latter in turn causes the energization of the relay magnets R35 and the skip magnet 46 as previously described. The relay magnet R36 also closes the contacts R36AL, thereby causing the energization of the relay R32, which closes its stick contacts R32A so that the circuit extends through such contacts back to the line 162 through the contacts 525. It is also pointed out that the stick circuit for the relay magnet R35 and the skip magnet 46 also extends back to the line 162 through the contacts 525, therefore the stick circuit for relay R32, R35 and the skip magnet 46 are held until contacts 525 subsequently open.

In the manner previously described, the skip lifter arm 141 (Fig. 9) is shifted, due to the energization of the skip magnet 46. Also as previously stated a circuit is closed to cause the energization of the magnet 544. This magnet draws downwardly on interposer 539 and rocks the bail 549 and the shaft 553 and, it will be recalled, rocking of this shaft (Fig. 7) will elevate the dog 550, moving it out of engagement with the tooth of the escapement rack 552. At the same time, since the dog 550 is elevated, contacts 564 are open. Since the dog 550 has been elevated to release the carriage for skipping and since the dog 550 has been maintained in raised position by the skip lifter arm 141, the carriage will automatically skip the column 10 at which position there is provided a notch 140C in the skip bar 140 (see Fig. 10). This enables dog 550 to drop downwardly which will cause the closure of the contacts 564 and referring to Fig. 5, a circuit will be closed from the line 162 through contacts 564, thence through relay contacts R32B, relay contacts R35B, through the punch magnet 544 to the line 163. This will send an impulse to the punch magnet 544 which again causes the elevation of the dog 550 out of the tooth of the rack 552, corresponding to column 10. From column 10 to the last column position, the skip bar 140 is provided with a straight high portion which will cause the dog 550 to be retained in elevated position. The carriage will thereby skip to the last column position and at such position there automatically ensues a card ejecting operation and then the automatic carriage return effected by the opening of contacts 525 and closure of contacts 622. The opening of contacts 525 will break the stick circuits of the relays R32, R35 and the skip magnet 46 and the parts controlled thereby will return to normal position.

Summarizing the spacing of the card carriage to either the eighth or ninth column position and the operation of the X key at such column position will cause the automatic skipping of the card carriage to the last column position irrespective of the tendency to stop the carriage at column 10.

AUTOMATIC SKIPPING OF CARD CARRIAGE UPON COMPLETION OF PUNCHING OF LAST DIGIT IN AMOUNT REPRESENTING FIELD

The machine is provided with an arrangement to effect automatic skipping of the card carriage upon completion of the punching of the amount in the units denominational column which, in the example assumed, is the fourteenth column. When this column is punched, the carriage spaces to the fifteenth column position and then skips to the last column position.

Referring to Fig. 5, when the carriage occupies the fifteenth column position, a circuit is closed from the line 162 through contacts 564 to the column selector brush 527 to the contact point 529 at the fifteenth column position, thence through the relay magnet R36 to the line 163. It will be recalled that this is the relay which is energized upon the depression of the X key 160 and as previously explained, the energization of the relay magnet R36 will close its contacts R36AU, thereby energizing the relay R35 and the skip magnet 46. Referring to Fig. 5, a circuit is closed from the line 162 through the relay contacts R36BL, thence through the relay contacts R35B to the punch magnet 544 to line 163. This will cause the elevation of the stepping dog 550 (Fig. 7) as previously explained, thereby raising the dog from the tooth at the fifteenth column position and since the skip lifter 141 has been shifted, the dog will be retained in its elevated position because beyond the fifteenth column position the skip lifter remains on a continuous high part of the skip bar so as to retain the stepping dog elevated, enabling the carriage to automatically move to the last column position.

Summarizing, upon spacing the carriage to the fifteenth column position, the automatic skipping mechanism is operative to skip the card carriage to the last column position without any attention on the part of the operator.

KEY LOCKING MECHANISM

Reference has been previously made to the automatic release of the card carriage of the punching machine when punching operations have been terminated and it will be recalled that during this time the dog 550 will be elevated, thereby opening contacts 564 (Fig. 7). Also at the last column position of the punch carriage, these contacts will also be opened and, referring to Fig. 5, it will be seen that the opening of the contacts 564 opens the circuit to relay magnet R47 and the latter will then have its contacts in the position shown to thereby close the circuit to the key locking magnet 435 and cause the same to be energized to lock the keys against operation. This is the condition of the machine when the punch carriage is at the last column position.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a record making machine, the combination of a carriage carrying a sheet to be recorded upon, a skipping mechanism for said carriage to skip said carriage from an initial column position to a predetermined column position and including means for determining the predetermined column position said carriage is to be stopped, means to initiate the operation of said skipping mechanism, and supplemental means, requiring for its operation the position of said carriage at other than said initial column position, for causing upon the operation of said skipping mechanism by said initiating means the determning means to be ineffective to enable the skipping of said carriage beyond said predetermined column position to a final position of said carriage, whereby said carriage instead of being stopped by the determining means at said predetermined column position automatically skips beyond to said final column position.

2. In a punching machine, the combination of punches for punching a record column by column, a carriage carrying said record, an escapement mechanism for controlling the column by column spacing of said record, a skipping mechanism for skipping said carriage to a predetermined column position and including means for determining the predetermined column position said carriage is to be stopped, means to initiate the operation of said skipping mechanism when said carriage is located at a certain card column position, a selector movable with said carriage, and means including means under control of said selector when the carriage is at a card column position other than said certain card column position for causing, upon the operation of said initiating means for said skipping mechanism, said determining means to be ineffective to enable the carriage to be skipped to said predetermined column position and thereafter cause the further operation of said skipping mechanism to skip said carriage to a final column position, whereby said carriage instead of being stopped by the determining means at said predetermined column position skips beyond to said final column position.

3. In a punching machine the combination of punches for punching a record column by column, a carriage carrying said record, an escapement mechanism for controlling the column by column spacing of said carriage, skipping mechanism including means to determine the extent of movement of said carriage corresponding to skip to a predetermined column position, at which position said escapement mechanism holds said carriage, means to disable the operation of said escapement mechanism and to initiate the operation of said skipping mechanism to skip said carriage to the predetermined column position, and means automatically operable upon said carriage reaching a column position delimited by said determining means to render the latter ineffective and to again disable said escapement mechanism to thereby release said carriage to cause the latter under control of said skipping mechanism to skip to a final column position.

4. In a punching machine the combination of punches for punching a record column by column, a carriage carrying said record, escapement mechanism for controlling the column by column escapement of said carriage, operating means for said punches and said escapement mechanism to space the carriage a column for each punching operation, skipping mechanism including a skip bar having a notch at a predetermined column position, a skip lifter cooperating with said bar and said escapement mechanism, means to shift said skip lifter and to cause the operation of said escapement mechanism to enable said skip lifter to render the escapement mechanism ineffective to hold the carriage to enable the latter to skip a position corresponding to said notch, and means automatically operable upon said carriage reaching a column position delimited by said notch to again cause the operation of said operating means whereby the latter again renders the escapement mechanism subsequently ineffective to hold said carriage to enable said skipping mechanism to be effective to skip the carriage to a final column position.

5. In a punching machine the combination of punches for punching a record column by column, a carriage carrying said record, an escapement mechanism for controlling the column by column escapement of said carriage and including a carriage locking dog, skipping mechanism including a skip bar having a notch at a predetermined column position, a skip lifter cooperating with said bar and locking dog, means to shift said skip lifter to disable the locking dog to enable the skipping of the carriage to a position corresponding to said notch at which position said dog moves to a carriage locking position, and means automatically operable upon said carriage reaching a column position delimited by said notch to shift said dog to a carriage unlocking position to enable said skipping mechanism to be automatically effective to skip the carriage to a final column position.

6. In a punching machine the combination of punches for punching a record column by column, a carriage carrying said record, escapement mechanism for controlling the column by column feed of said carriage, operating means for said punches and said escapement mechanism, skipping mechanism including a skip bar having a notch at a predetermined column position, a skip lifter cooperating with said bar and escapement mechanism, means to shift said skip lifter to disable the escapement mechanism to enable the skipping of the carriage to a position corresponding to said notch, and means automatically operable upon said carriage reaching a column position delimited by said notch to cause the operation of said punch operating means and thereby said escapement mechanism to cause the latter to be disabled by said skip lifter to enable said skipping mechanism to be effective to skip the carriage to a final column position.

7. In a punching machine, the combination of punches for punching a record column by column, a carriage carrying said record, escapement mechanism for controlling the column by column feed of said carriage, skipping mechanism including a skip bar having a notch at a predetermined column position, a skip lifter cooperating with said bar and escapement mechanism, means to shift said skip lifter to disable the escapement mechanism to enable the skipping of the carriage under control of said skip bar to a position corresponding to said notch, and means automatically rendered operable under control of the notch in said skip bar upon said carriage reaching a column position delimited by said notch to render said escapement mechanism subsequently disabled to cause said skipping mechanism to be again effective to skip the carriage to a final column position.

WILLIAM L. LEWIS.
ELLIOTT W. GARDINOR.